United States Patent [19]

Willegger et al.

[11] 3,994,850

[45] Nov. 30, 1976

[54] MODIFIED UREA-FORMALDEHYDE RESIN ADHESIVE

[75] Inventors: Walter N. Willegger, Brookfield, Conn.; Horst G. Thiel, Redding, Calif.

[73] Assignee: Champion International Corporation, Stamford, Conn.

[22] Filed: Jan. 5, 1976

[21] Appl. No.: 646,448

[52] U.S. Cl. .......................... 260/29.4 R; 260/17.5; 260/67 S; 260/68; 260/69 F; 260/70 R; 260/71; 260/849

[51] Int. Cl.² ................ C08L 61/20; C08L 97/00

[58] Field of Search ............... 260/17.5, 69, 70, 67, 260/68, 849, 29.4, 71

[56] References Cited

UNITED STATES PATENTS

| | | | |
|---|---|---|---|
| 3,015,649 | 1/1962 | Zorn et al. | 260/70 R X |
| 3,097,177 | 7/1963 | Emerson | 260/17.5 X |
| 3,689,463 | 9/1972 | Kruglikov | 260/70 R |

FOREIGN PATENTS OR APPLICATIONS 1,570,240   8/1973   Germany

OTHER PUBLICATIONS

Chem. Abs. 35:P524,695; 39:P840⁷; 42:8517i; 82:P45450f; P:31901s.

*Primary Examiner*—Murray Tillman
*Assistant Examiner*—T. DeBenedictis, Sr.
*Attorney, Agent, or Firm*—Evelyn M. Sommer

[57] ABSTRACT

Improved adhesive resin and resin-containing products are described. These adhesives are urea-formaldehyde resins formed in the presence of lignin-sulfonate extender.

5 Claims, No Drawings

MODIFIED UREA-FORMALDEHYDE RESIN ADHESIVE

This invention relates to modified urea-formaldehyde resins and to their preparation. Also involved are composite products, adherently bound by the cured resin. More particularly, the modified resins of this invention comprise urea-formaldehyde prepared in the presence of, and containing, lignin-sulfonate extender.

Urea-formaldehyde resins, with or without modification or extender, are well known in the art. These thermosetting resins have, for example, found increasing use as adhesives for plywood, particle board, fiber board, and the like. This use in industry has made it desirable to improve their quality and performance.

Where conventional urea-formaldehyde resins are used, their performance at times leaves much to be desired. Particularly objectionable is the presence of free formaldehyde and the consequent, undesirable odor. In addition, the expense and the quantity of these resins required for adequate adhesive strength and eventual product structural stability are high. Means of employing lesser quantities of resin, without loss of adhesive strength, are therefore highly desirable.

It has now been discovered that these, and other objectives and advantages as are described hereinbelow, are achieved by appropriate incorporation of lignin-sulfonate extender within urea-formaldehyde resins.

Although the three critical constituents of the modified resins of this invention are well known and have been previously combined in the prior art — see, for example, U.S. Pat. No. 2,266,265 of Reiche et al. and U.S. Pat. No. 2,622,979 of Keim — it has not previously been recognized that the manner of their combination significantly alters the properties of the eventual resin.

Unlike the prior art processes of these representative patents, in accordance with this invention the lignin-sulfonate is added to the formaldehyde and urea precursors of the adhesive resin before any substantial reaction has occurred therebetween. It is only by bringing these three constituents together in unreacted form and then performing the additional steps of this process that all the objects and advantages of this invention are obtained.

In the process of this invention, a modified resin is produced by a process involving:

Step a: forming a basic aqueous solution of urea, formaldehyde, and lignin-sulfonate to produce methylol-urea condensates;
Step b: acidifying and heating the reaction medium to effect polymerization;
Step c: neutralizing the medium with base and adding further urea; and then
Step d: cooling to stabilize the polymeric resin adhesive.

In the foregoing process, the initial production of condensates is ordinarily performed utilizing an aqueous medium having a pH of from 7.1 to 8.5, preferably 7.2 to 7.5. The formaldehyde-to-urea ratio may be from about 1.8 to 2.5 moles of formaldehyde per mole of urea. The lignin-sulfonate is desirably provided in an amount from about 5 to 30, preferably 5 to 15%, by total weight of resin solids. This medium desirably has a total reagent content of from 55 to 80% in order to simplify preparation of concentrated resin adhesives while facilitating essentially complete reaction of the resin precursors.

This medium may be formed by simple admixture of readily available forms of its essential formaldehyde, urea and lignin-sulfonate reagent constituents. If further required, the pH of the medium may then be adjusted with any base or acid.

The urea may be incorporated into the medium as an aqueous solution of virtually any, but desirably at least 50% by weight, concentration. More preferred, however, is solid urea because it facilitates control over the final solids concentration of the medium.

Formaldehyde is also available in wide ranging aqueous and/or alcoholic solution concentrations. Aqueous solutions of at least about 35% by weight are preferred. Alternatively, paraformaldehyde — a solid — may be employed. Again, use of a solid reagent simplifies control of total solids content in the medium and eventual adhesive.

A particularly preferred starting material is the urea-formaldehyde concentrates common in commerce. These concentrates are aqueous formaldehyde solutions stabilized with urea. They ordinarily exhibit reagent concentrations of from about 70 to 85% by weight and may readily be adjusted to the desired formaldehyde/urea ratio.

Although essentially pure lignin-sulfonate may be utilized in forming the initial reaction medium for this process, the spent liquor of sulfite pulping of wood or other lignocellulosic materials is more economical. These aqueous waste liquor by-products ordinarily contain from about 20 to 40% of lignin-sulfonate by weight. In addition they contain other solids — principally sugars and salts — of from 20 to 40% by weight which appear useful as further extenders within the scope of this invention.

The condensation reaction of step (a) is preferably performed by heating the medium to elevated temperatures of from about 65° to 95° C in from 10 to 90, preferably 20 to 40, minutes. In addition to the customary production of methylol-ureas, some reaction between the formaldehyde and lignin-sulfonate also appears to occur. This secondary reaction is evidenced by the unexpectedly reduced concentration of free formaldehyde obtained throughout the present invention.

For step (b), the reaction medium of step (a) is preferably acidified with an acid, for example formic or sulfuric, to produce a pH of from about 5.0 to 6.5. The acidified medium is then maintained at from 88° to 98° C, preferably 90° to 95° C, until the resin has effected the desired degree of polymerization.

This "degree of polymerization" is empirically measured by determining the viscosity of the resin solution. The measurement is ordinarily performed with Gardner viscosity comparison tubes. Those familiar with this type of art will recognize that a particular terminal viscosity will vary depending on the concentration of solids in the final product, whether or not the formaldehyde solution contains alcohol or other ingredients, whether a thin or viscous final product is required, and like well-known variables. The practice of this invention is, however, readily accomplished through only routine experimentation, by which determination of optimum viscosity (and the corresponding degree of polymerization which this measure indicates) for any particular application is obtained.

In step (c) of the process, the polymeric resin is neutralized by addition of any suitable base such as, for example, triethanolamine. The pH of the medium should preferably be brought to from about 7.1 to 7.4.

After neutralization, additional urea is incorporated into the stabilized resins. This urea is added in an amount sufficient to decrease the formaldehyde to urea mole ratio to from 1.2 to 1.7 moles of formaldehyde per mole of urea. Most preferably, this final range is between 1.55 to 1.65:1. This reduction of the formaldehyde-urea ratio must occur at this stage of the process. Such a ratio, at an earlier point in the process, results in undesirable gellation or precipitation.

The utilization of the present extended resin as an adhesive may be performed in conventional manner. In the preparation of a particle board material, for example, hardener is incorporated into the resin, the resin is applied to a board furnish in from about 4 to 15% of adhesive by total weight, and the admixture is subjected to heat and pressure sufficient to thermoset the adhesive and particles into an integral composite of desired configuration.

In a preferred aspect of this invention, the hardener employed in an ammonium salt of a strong acid which produces free acid during conventional thermosetting. Thus, for example, a salt such as ammonium chloride or ammonium sulfate (which may be buffered with, for example, ammonium hydroxide) is incorporated into the resin in an amount of from about 0.5 to 5% of acid salt by solids weight.

In accordance with this preferred embodiment, the conventional application of heat and pressure required for thermosetting the adhesive also results in the acidification necessary for curing the resin. This technique thereby both simplifies use of the adhesive and permits more complete control during its application and curing.

The following examples illustrate the invention. Unless otherwise designated, all constituents are designated on the basis of parts by weight.

EXAMPLE 1

1,700 kg of lignin-sulfonate waste liquor (containing about 57% by weight of sodium ligno-sulfonate) were admixed with 7,700 kg of commercial urea-formaldehyde concentrate in a reaction kettle maintained under high speed agitation. 2,100 kg. of solid prilled urea was then added to the kettle in order to decrease the formaldehyde:urea ratio to 2.1:1. This addition resulted in decrease in the proportion of lignin-sulfonate to 14%, by weight, of total solids.

4.5 kg of triethanolamine was then added to raise the pH of the solution in the reaction kettle to 7.3. The medium was heated for 20 minutes to increase its temperature to 75° C. Thereafter, in stepwise manner, 23 kg of 24% formic acid was added in 4.5 kg increments over a period of about 5 minutes. This addition resulted in an increase in kettle temperature to about 95° C and in a pH of about 6.1.

While maintaining this pH and temperature, samples of the medium were removed in 15-minute intervals and subjected to viscosity measurement to determine the degree of polymerization. The results of these measurements were as follows:

| Time of Sampling After Initial Acid Addition | Viscosity (CPS) |
| --- | --- |
| 10 min. | 140 |
| 25 min. | 210 |
| 40 min. | 280 |
| 55 min. | 350 |

After reaching a viscosity of 350 centipoise the reaction medium was immediately neutralized to a pH of 7.3 by addition of triethanolamine. Heating was also ceased and the reaction medium was permitted to cool. Upon the media reaching 85° C, 1,100 kg of prilled urea were added to reduce the formaldehyde:urea ratio to 1.6:1. The medium was then permitted further to cool to below 65° C and then transferred from the kettle into a storage tank maintained at 20° C. It was held in the storage tank in stable form until used as an adhesive.

A sample of the adhesive was taken during transfer of the resin to the storage tank. It was analyzed for free formaldehyde content by standard sodium sulfite test and showed a free formaldehyde content of about 2%. This compares favorably with the 3.5% content found in a similar urea formaldehyde resin prepared without addition of lignin-sulfonate.

EXAMPLE 2

Modified resin produced by the process of Example 1 was compared with a control urea-formaldehyde resin which had not been extended with lignin-sulfonate. Both resins exhibited the same urea:formaldehyde ratio of 1.6:1 and were compared through the preparation of particle board. Different particle boards were produced with control resin and extended resin adhesives containing a hardener of 1.5% ammonium sulfate (buffered with 1.0% of ammonium hydroxide) by weight of resin solids.

The boards were prepared using the respective resin adhesives as binders for the cores of three-layer fiber-faced particle boards. These cores were composed of ground and flaked Western softwood chips and constituted 72% by wood weight of the board, the facings each being 14% of Douglas fir fiber.

The resins were sprayed onto the softwood core material in the amounts specified below. In similar manner, a phenol-formaldehyde adhesive was applied to the fiber face material. The two materials then were formed into three-layer mats and thermoset in a hydraulic press at 17.5 kg/cm$^2$ and 155° for 6 minutes. The panels were allowed to equilibrate under ambient conditions for 24 hours prior to testing. Significantly, a substantial decrease in the odor of formaldehyde — which reflects the lower free formaldehyde content encountered in accordance with this invention — was observed during thermosetting and subsequent handling of the panels containing extended resin.

The structural integrity of the panels was tested by measurement of their internal bond strengths through the procedure of ASTM D1037-64. This test reflects the resistance to panel separation within the core where the surface layers are pulled in opposite directions perpendicular to the plane of the panel specimen. Twenty different specimens were tested for each resin to insure that the data represented an average for each comparison.

Comparison A

With panels prepared utilizing 5.75% of resin adhesive by weight of core material, the following results were obtained:

|  | Extended Resin | Control Resin |
|---|---|---|
| Board Thickness | 21 mm | 21 mm |
| Board Density | .74 g/cc | .73 g/cc |
| Internal Bond Strength | 6.4 kg/cm$^2$ | 5.8 kg/cm$^2$ |

Comparison B

With panels prepared utilizing 6.75% of resin adhesive by weight of core material, the following results were obtained:

|  | Extended Resin | Control Resin |
|---|---|---|
| Board Thickness | 21 mm | 21 mm |
| Board Density | .71 g/cc | .72 g/cc |
| Internal Bond Strength | 7.0 kg/cm$^2$ | 6.5 kg/cm$^2$ |

Additional specimens of the panels tested in Comparison B were also examined for their ability to withstand exposure to elevated temperature. These specimens were held at 105° C for 48 hours and then tested for their internal bond strengths. These measurements showed that the control resin retained 93% of its initial bond strength whereas the extended resin retained 97%.

This data shows that lignin-sulfonate is not only a useful extender of, but actually improves, urea-formaldehyde resin adhesives. As a partial replacement for the resin, lignin-sulfonate also permits use of lower quantities of the extended resin without loss of overall strength of bonding and provided resistance to thermal weakening.

I claim:

1. A process for producing a modified resin adhesive comprising:
    a. forming a basic aqueous medium of formaldehyde, urea, and lignin-sulfonate having a pH of from 7.1 to 8.5, said formaldehyde and urea being provided in a mole ratio of from 1.8 to 2.5:1 and said lignin-sulfonate comprising from 5 to 30% by total solids weight and heating said basic aqueous medium to a temperature of from 65° to 95° C;
    b. acidifying and maintaining said medium at a pH of from 5.0 to 6.5 and at a temperature of from 88° to 98° C for a period of time sufficient to form adhesive resin;
    c. adjusting the medium containing resin to an alkaline pH of from 7.1 to 7.4 and adding sufficient urea to the basic medium to provide a formaldehyde:urea mole ratio of from 1.2 to 1.7:1; and
    d. cooling said medium to a temperature below 65° C to produce a stable adhesive resin.

2. The process of claim 1, wherein the lignin-sulfonate of the aqueous medium of step (a) is present in an amount of from 5 to 15% by total solids weight.

3. The process of claim 1, wherein from 0.5 to 5% by solids weight of an ammonium salt of a strong acid is incorporated into the cooled, stabilized resin.

4. The adhesive resin produced by the process of claim 1.

5. In a composite board comprising adhesively bound particulate cellulosic material, said board being formed by subjecting an admixture of said material and 4 to 15% of adhesive resin by weight to conditions of pressure and temperature sufficient to cure said admixture into an integral composite structure, the improvement which comprises forming said board with the adhesive resin of claim 4.

* * * * *